United States Patent [19]

Flynn et al.

[11] Patent Number: 4,827,720
[45] Date of Patent: May 9, 1989

[54] MASTER CYLINDERS WITH REAR EXTERIOR SHELL FORMING RESERVOIR PASSAGE

[75] Inventors: Derek J. Flynn, Solihull, England; Alfred W. Thomas, Saarbrucken, Fed. Rep. of Germany; John F. Pickering, Nr. Rugby, United Kingdom

[73] Assignee: Lucas Industries Limited, Birmingham, England

[21] Appl. No.: 764,509

[22] Filed: Aug. 9, 1985

Related U.S. Application Data

[63] Continuation of Ser. No. 283,622, Jul. 15, 1981, abandoned.

[30] Foreign Application Priority Data

Aug. 14, 1980 [GB] United Kingdom ............... 8026497
Apr. 3, 1981 [GB] United Kingdom ............... 8110573
Apr. 3, 1981 [GB] United Kingdom ............... 8113362

[51] Int. Cl.[4] .......................... B60T 11/26; F15B 7/08
[52] U.S. Cl. .................................. 60/547.1; 60/585; 60/588
[58] Field of Search ............. 60/547.1, 585, 588, 60/589, 592

[56] References Cited

U.S. PATENT DOCUMENTS

| | | | |
|---|---|---|---|
| 1,945,728 | 2/1934 | Brush | 60/585 |
| 2,162,797 | 6/1939 | Boldt | 60/588 |
| 2,224,125 | 12/1940 | Dick | 60/588 |
| 2,759,329 | 8/1956 | Ponti | 60/588 |
| 2,977,767 | 4/1961 | Randol | 60/588 |
| 3,044,267 | 7/1962 | Hicks | 60/588 |
| 3,186,174 | 6/1965 | Hayman | 92/171 |
| 3,545,206 | 12/1970 | Belart | 60/588 |
| 4,347,779 | 9/1982 | Belart | 92/48 |

FOREIGN PATENT DOCUMENTS

| | | | |
|---|---|---|---|
| 921176 | 11/1945 | France | 60/588 |
| 1406357 | 9/1964 | France . | |
| 422214 | 1/1935 | United Kingdom | 60/585 |
| 900327 | 7/1962 | United Kingdom | 60/588 |
| 1481612 | 8/1977 | United Kingdom . | |

*Primary Examiner*—Robert E. Garrett
*Assistant Examiner*—George Kapsalas
*Attorney, Agent, or Firm*—Scrivener and Clarke

[57] ABSTRACT

A master cylinder for a vehicle braking system comprises a body (2) with a bore (3) open at the rear end of the body, a reservoir (4), a transverse port (17) in the body opening into the bore (3) and positioned rearwardly of the reservoir, and a passageway defined between the exterior of the body (2) and a sleeve (22) mounted thereon to communicate the transverse port (17) with a chamber (7) of the reservoir. in different disclosed embodiments the sleeve may be integral with the housing of a booster assembled with the master cylinder and an element may be interposed between the sleeve and the master cylinder body and be provided with a tubular extension interconnecting the reservoir with the passageway.

21 Claims, 3 Drawing Sheets

MASTER CYLINDERS WITH REAR EXTERIOR SHELL FORMING RESERVOIR PASSAGE

This application is a continuation of application Ser. No. 283,622, filed July 15, 1981 now abandoned.

BACKGROUND OF THE INVENTION

1. Field of the Invention

This invention relates to master cylinders for vehicle braking systems, and in particular to a master cylinder which comprises a body with an axial bore open at the rear end of the body, a reservoir chamber, a transverse port in the body opening into the bore and positioned rearwardly of the reservoir chamber, and a passage communicating said reservoir chamber with said transverse port.

2. Description of the Prior Art

A master cylinder of the above form is proposed in our copending British patent application No. 8018215 (Publication No. 2052656 and U.S. Ser. No. 154,798, filed May 30, 1980 and now abandoned) and the advantage of this construction is that it allows the reservoir to be located at the forward end of the body, whereby the rear end of the master cylinder can be received within an actuating servo-booster and an overall space saving achieved.

In the master cylinders disclosed in the aforementioned Application the transverse port which is normally open to a pressure chamber defined in the bore of the master cylinder body, communicates with the reservoir chamber through a longitudinal passageway extending through the wall of the body parallel to the bore axis, the passageway extending forwardly from an internal shoulder formed in the bore to the reservoir chamber and intersecting the transverse port.

It has now been found that the longitudinal passageway is more difficult to machine through the body wall than had been anticipated. The main problems encountered are difficulty in maintaining the straightness of the passageway over the necessary length; difficulty in ensuring correct fluid connection between reservoir chamber and transverse port; and weakening of the wall of the master cylinder body. Although the last mentioned problem could be avoided by making the body wall thicker it would be contrary to the main objectives of minimising space and weight.

SUMMARY OF THE INVENTION

The present invention aims at avoiding the problems of the previously proposed construction and accordingly provides a master cylinder of the form initially described above wherein the passageway communicating the transverse port with the reservoir chamber is defined over at least part of its length between the outside of the body and a member mounted on the body.

This construction with the passageway formed between the body and the member allows all the problems associated with drilling a longitudinal passageway in the body wall to be positively eliminated.

An especially simple arrangement is obtained when the said member mounted on the body takes the form of a sleeve. Assembly of the master cylinder is facilitated if the sleeve is made a sliding fit on the body, in which case to avoid any need to machine a groove or the like in the outside surface of the body, the sleeve is preferably provided with at least one longitudinal groove on its internal surface to define the passageway. Grooves are comparatively simple to produce on the inside of the sleeve, either during moulding in the case of a plastics sleeve, or by crimping to form flutes in the case of a pressed metal sleeve. It is of advantage if the sleeve projects beyond the rear end of the body and is sealed to the actuating rod protruding through the open end of the master cylinder bore, since the passageway may then also serve to communicate, via the end of the body, the reservoir chamber with a recuperation chamber defined in the bore behind the piston.

If the master cylinder is to be assembled with a booster the member mounted on the body can be made integral with the booster housing, whereby the need for a separate member is eliminated and a simpler construction obtained. In an especially advantageous embodiment the member is a sleeve integral with a front part of the booster housing and at least a part of the reservoir housing is also integral with the front part of the booster housing and includes a port communicating the reservoir chamber with the interior of the sleeve. With these parts made in a single moulding manufacture and assembly are further simplified.

It is possible for an element to be interposed between the body and the member mounted thereon and to define partially the passageway, which may be of benefit in simplifying the member itself. For example, the element may be a tubular liner which is a sliding fit on the body and the member a metal sleeve which is a sliding fit on the liner. The element can be provided with an integral tubular portion which defines a duct communicating the reservoir chamber with that part of the passageway defined between the member and the body, which facilitates the use of a reservoir housing made separately from the master cylinder body. The member mounted on the body over the element can comprise a sleeve or part of a booster housing as described above.

BRIEF DESCRIPTION OF THE DRAWINGS

To assist a better understanding of the invention some embodiments will now be described in greater detail with reference being made to the accompanying drawings in which.

DETAILED DESCRIPTION OF THE PREFERRED EMBODIMENTS

Figure 1:
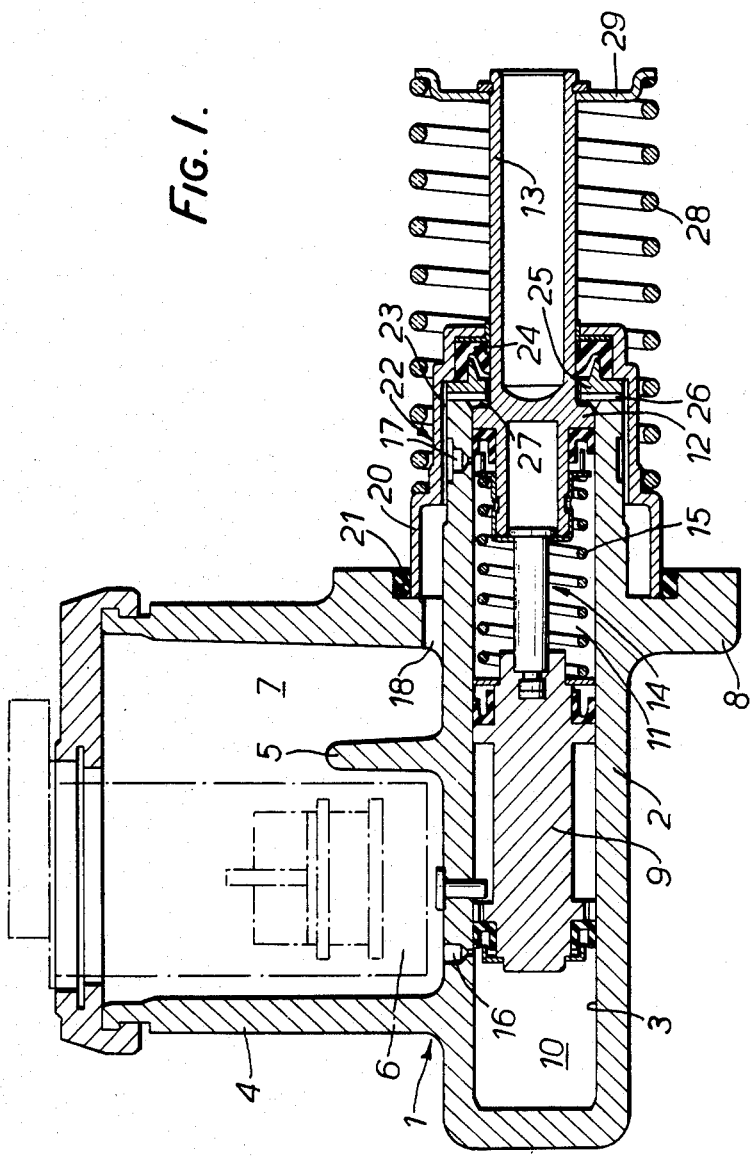
FIG. 1 shows an axial cross-section a tandem master cylinder in accordance with the invention.

In the drawings the same reference numerals have been used to indicate corresponding parts in the different embodiments.

The tandem master cylinder illustrated in FIG. 1 is intended for a dual circuit braking system and comprises an integrally cast or moulded housing 1 including a body 2 with an axial blind bore 3 open at the rear end of the body, a reservoir 4 divided internally by a baffle 5 into two chambers 6,7 and a flange 8 for mounting the master cylinder to a booster or other vehicle component. A piston 9 separates the bore into front and rear pressure chambers 10,11 and is coupled to a second piston 12 formed integrally with a hollow actuating rod 13, by a telescopic device 14 which limits separation of the pistons, a spring 15 serving to urge the pistons axially apart. A port 16 connects the reservoir chamber 6 to the front pressure chamber 10 in the illustrated unactuated condition of the master cylinder, while a further transverse port 17 extending through the body 2 connects with the rear pressure chamber 11. The mounting flange 8 is provided with a groove extending about the body 2 and a port 18 connects the groove with the reservoir chamber 7. A sleeve 20 is fitted over the rear of the body 2, the forward end of the sleeve being received in the groove of flange 8 and sealed to the outer wall of the groove by an O-ring seal 21. A medial portion 22 of the sleeve is crimped or fluted to define axially extending internal fins 23 which slidably engage the outer surface of the body 2. The rear end of the sleeve 20 is sealed to the actuating rod by a seal 24 which is supported by a seal support member 25 held against the end of the master cylinder housing by an internal shoulder on the sleeve. The member 25 has radial grooves 26 which connect the passages defined between the fins 23 of sleeve 20 with a recuperation chamber 27 for the seal of piston 12. As illustrated, the sleeve 20 is held in position by the main return spring 28 which is interposed between an external shoulder on the sleeve and a collar 29 fitted on the actuating rod.

From the foregoing description it will be understood that the sleeve 20 and the external surface of the body 2 define a passageway communicating reservoir chamber 7 with the transverse port 17 and the recuperation chamber 27.

The operation of the master cylinder will be clear to those skilled in the art and does not require a detailed description. When the actuator rod 13 is pushed forwards piston 12 slides forward so that its seal cuts off port 17, and piston 9 moves forward so that its seal cuts off port 16. Further forward movement of the pistons pressurises the hydraulic fluid in chambers 10 and 11, this pressure being transmitted to the slave cylinders to apply the brakes. Fluid is supplied to the recuperation chamber 27 from reservoir chamber 7 to prevent a vacuum behind the piston 12.

Instead of being made integral with the body 2, the reservoir 4 may be made separately and connected to the body which is provided with the usual connecting boss. In either case port 18 can be formed during casting or moulding so that a subsequent machining step is unnecessary.

Figure 2:
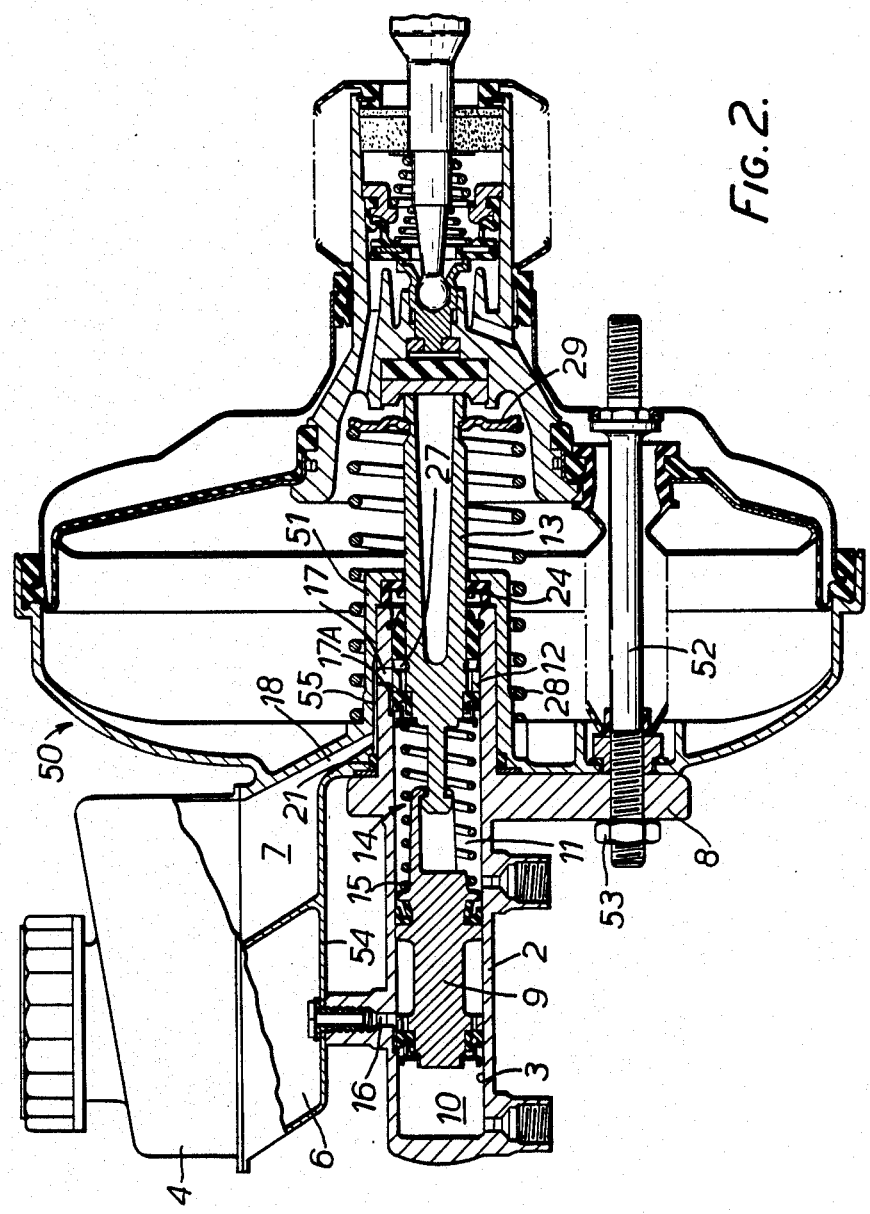
FIG. 2 shows in axial cross-section another tandem master cylinder according to the invention and in combination with a servo-booster.

In FIG. 2 there is shown a master cylinder of the same basic form to that described with reference to FIG. 1, in combination with a booster. The booster is of known construction and a detailed description of its construction and operation is not considered necessary here.

The booster housing is formed in two halves in well known manner. The front half or part 50 of the housing includes a central tubular portion or sleeve 51 defining a cylindrical recess in which the rear end of the master cylinder body 2 is received so that its mounting flange 8 abuts the front surface of the booster housing and against which it is clamped by the bolts 52 and nuts 53. The booster housing is sealed to body 2 by a seal 21 located adjacent the mounting flange 8 and a further seal 24 seals the rear end of sleeve 51 to the actuating rod 13 of the master cylinder which projects through the rear end of body 2.

A lower part 54, at least, of the master cylinder reservoir 4 is made integrally with the booster housing part 50 and a passageway 18 is included to communicate the reservoir chamber 7 with a longitudinal groove 55 provided on the inside surface of the sleeve 51 and in register with the rear transverse port 17 of the master cylinder. Thus, the booster housing and master cylinder body define between them a passage connecting port 17 and reservoir chamber 7. It should be noted here that the port 17 intersects a groove 17A provided in the wall of the master cylinder bore so that the port communicates with the bore on both sides of the piston seal, whereby a further passage for communicating the reservoir with the recuperation chamber 27 defined in the bore 3 behind the seal of rear piston 12 is no longer necessary.

The operation of the master cylinder when the booster is actuated to push the rod 13 forwards will be clearly understood from the description of the FIG. 1 embodiment.

The booster housing part 50 including the reservoir and central tubular sleeve 51 as well as the passageway 18 may be moulded from plastics material or, alternatively, may consist of a die-casting.

Figure 3:
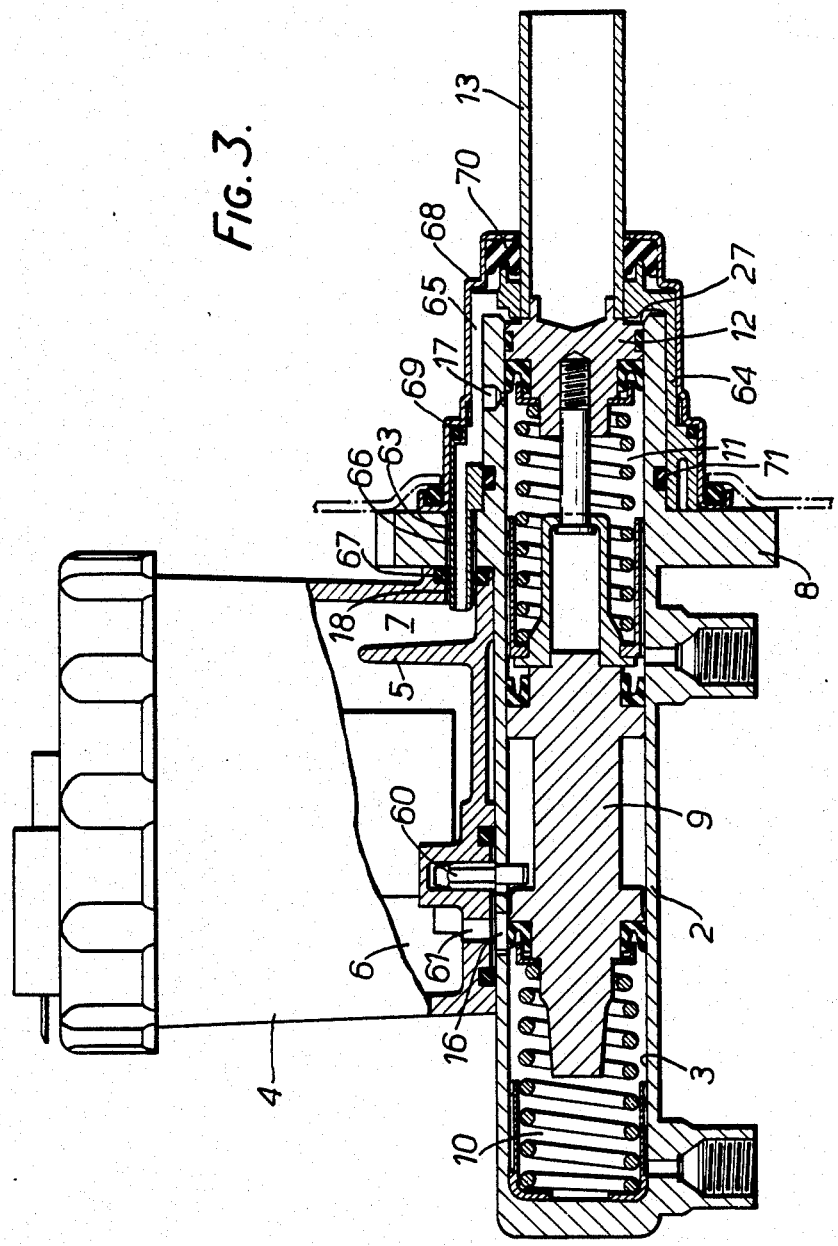
FIG. 3 shows a third tandem master cylinder embodying the invention, also in axial cross-section.

In the master cylinder shown in FIG. 3, the reservoir housing 4 is formed separately from the body 2 rather than integral with it as in FIG. 1. The housing 4 is located on the body by a pin 60 which passes through the wall of body 2 and forms a stop for piston 9, a port 61 leading from reservoir chamber 6 being in register with port 16 in the body, and a port 18 leading from reservoir chamber 7 being aligned with a hole 63 through the master cylinder mounting flange 8. The reservoir housing 4 is held on the body 2 by one or more clips (not shown).

Fitted over the end of the body rearwardly of the flange 8 is a moulded plastics liner 64 of essentially cup-shape with an axial opening through which the actuating rod 13 passes. The liner 64 includes a longitudinal slot 65 which extends radially the full thickness of the liner, and a forwardly projecting integral tube 66 protruding through the hole 63 in flange 8 and into reservoir port 18 to which it is sealed by a seal 67. The slot 65 communicates as its forward end with the duct of tube 66, intersects the transverse port 17 in body 2, and communicates at its rear end with the recuperation chamber 27 behind piston 12.

Enclosing the liner is an outer sleeve 68, for example, of pressed steel, seals 69 and 70 being interposed between the sleeve 68 and the liner at a position in front of slot 65 and between the sleeve 68 and the actuating rod 13, respectively. A further seal 71 is placed between the liner 64 and the body 2.

From the foregoing description it will be realised that the slot 65 in the line which is closed on the outside by the sleeve 68, defines with the duct through the tubular extension 66 a passageway communicating the reservoir chamber 7 with the transverse port 17 and with the recuperation chamber 27. In assembling the master cylinder the reservoir housing 4 is first mounted on the body, the liner is then placed over the rear end of the body with tube 66 inserted through hole 63 into port 18 of the housing, and finally the sleeve 68 is fitted over the liner 64.

While a slot extending through the full width of the liner is preferred for ease of moulding it should be understood that a liner with a groove in place of the slot could be employed, in which case it may be possible to dispense with the outer sleeve altogether provided the necessary seals are established with the body and the actuating rod.

We claim:

1. In a master cylinder comprising a unitary body having an outer surface and front and rear ends, a bore within said body, a mounting flange carried on the outer surface of said body intermediate its front and rear ends, a reservoir chamber located entirely forwardly of said flange, said bore being located exteriorly of said chamber, a piston operable within said bore between retracted and extended positions, said retracted position being adjacent the rear end of said body, a transverse port rearwardly of said chamber and flange and extending through said unitary body from its exterior surface into said bore within said body adjacent to and ahead of the piston in its retracted position, and a passageway communicating said reservoir with said transverse port, the improvement which comprises a member extending rearwardly of said flange and covering a portion of the outer surface of said body, which portion includes said transverse port, at least a lengthwise part of said passageway being defined between said member and said exterior surface of said body portion rearwardly of said flange, and fluid conduit means exteriorly of said outer surface of said body and traversing said flange to connect said passageway with said reservoir chamber.

2. The improvement of claim 1, wherein said member has a part integral therewith, said part including a through duct communicating said reservoir chamber with said lengthwise part of the passageway defined between said member and said body.

3. The improvement of claim 1, wherein a booster is attached to the master cylinder for operating the master cylinder, the booster includes a housing connected to the master cylinder body, and said member is integral with said booster housing.

4. The improvement of claim 1, wherein an element is interposed between said body and said member and partly confines said passageway over said lengthwise part thereof.

5. The improvement of claim 4, wherein said element includes an integral tubular extension defining a duct having one end communicating with the reservoir chamber and an opposite end communicating with said lengthwise part of said passageway defined between the member and the body.

6. The improvement of claim 1, wherein said member comprises a sleeve surrounding the body.

7. The improvement of claim 6, wherein said sleeve is a sliding fit on said body exterior and comprises at least one longitudinal groove on the inner surface thereof defining partially said passageway.

8. The improvement of claim 6, wherein an actuating rod protrudes through said open end of the bore at the rear end of the body, said sleeve is fitted over the body and includes a portion which projects rearwardly beyond the rear end of the body, and a seal is inserted between said projecting sleeve portion and said actuating rod.

9. A master cylinder and booster assembly wherein the master cylinder includes a body having an axial bore, the booster includes a housing having a front part with an integral sleeve defining an axial recess, a rear end portion of the master cylinder body is received in said recess and includes a transverse port opening into the bore, a reservoir is supported on the body of the master cylinder at a position spaced from the booster housing, at least a part of said reservoir being integral with the front part of the booster housing and including a duct opening at one end into the interior of the reservoir, and a passageway is defined between the exterior of said rear end portion of the body and said sleeve, said passageway being connected to said duct thereby to communicate said transverse port with said reservoir.

10. A master cylinder comprising a body having opposed front and rear ends, an axial bore in the body, a reservoir carried on the body and having a rearwardly directed port, a transverse port in a portion of the body positioned rearwardly of said reservoir port, a tubular element fitted over said body portion and including a longitudinal slot intersecting said transverse port and an integral extension tube projecting forwardly from the element and connected to the reservoir port in a sealed manner, said tube having a duct therein communicating with said slot, and a sleeve fitted over the tubular element and closing the slot whereby to form with the element and the exterior of said body portion a closed passageway communicating the transverse port with the reservoir.

11. A master cylinder comprising a body (2) with an axial bore (3) open at the rear end of the body, a flange (8) on the body for supporting the body, said flange having front and rear faces, a reservoir (4) mounted on the body in front of the flange, the reservoir enclosing a reservoir chamber (7), a transverse port (17) in the body opening into the bore and positioned rearwardly of the reservoir chamber and the flange, and a passageway communicating said reservoir chamber with said transverse port for conducting brake fluid between the reservoir chamber and the bore, part of said passageway being defined outside of the body by a sleeve (22) mounted on the body and covering a portion of the body located rearwardly of the flange, characterised in that the forward end of the sleeve (22) is sealingly engaged with the rear face of the flange (8) at a position spaced radially outwardly from the body, and a port (18) through the flange (8) exteriorily of the body and extending between its front and rear faces to define a minor part of said passageway, said port connecting the space between the body and the forward end of the sleeve directly to the reservoir chamber (7).

12. A master cylinder according to claim 11, wherein the forward end of the sleeve is received in an annular groove formed in the rear face of the flange, and a seal (21) is accommodated in the groove for sealing the sleeve to the flange.

13. A master cylinder according to claims 11 or 12, wherein the sleeve (22) is a sliding fit on the body and comprises at least one longitudinal groove (23) on the inner surface thereof defining said passageway.

14. A master cylinder comprising a body (2) with an axial bore (3) open at the rear end of the body, a flange (8) on the body for supporting the body, a reservoir (4) mounted on the body in front of the flange, the reservoir enclosing a reservoir chamber (7), a transverse port (17) in the body opening into the bore and positioned rearwardly of the reservoir chamber and the flange, and a passageway communicating said reservoir chamber with said transverse port for conducting brake fluid between the reservoir chamber and the bore, part of said passageway being defined outside of the body by sleeve means (51; 68) mounted on the body and covering a portion of the body located rearwardly of the flange, characterised in that a through duct (18) formed on said sleeve means defines the remaining part of said passageway and connects the forward end of said passageway part defined by said sleeve means (51; 68) directly to the reservoir chamber (7), said duct traversing said flange.

15. A master cylinder according to any one of claims 11 to 14, wherein an actuating rod (13) protrudes through the open end of the bore and the rear end of the body, the sleeve means (22; 51; 68) projects beyond the rear end of the body, a seal (24; 70) is interposed between the rearwardly projecting portion of the sleeve means and the actuating rod, and the passageway communicates with a recuperation chamber (27) around the rear end of the body (2).

16. A master cylinder according to claim 14 wherein said duct (18) passes through said flange.

17. A master cylinder according to claim 14 wherein said duct (18) passes outwardly of said flange.

18. A master cylinder according to claim 14, wherein said sleeve means comprises a sleeve, the sleeve including a forwardly projecting part integral therewith and defining said duct.

19. A master cylinder according to claim 18, wherein a booster is assembled with the master cylinder for operating the master cylinder, the sleeve (51), a front part (50) of the booster housing and at least part of the reservoir housing (4) being formed by a unitary part incorporating said duct (18).

20. A master cylinder comprising a body with an axial bore open at the rear end of the body, a flange on the body for supporting the body, a reservoir mounted on the body in front of the flange, the reservoir enclosing a reservoir chamber, a transverse port in the body opening into the bore and positioned rearwardly of the reservoir chamber and the flange, and a passageway communicating said reservoir chamber with said transverse port for conducting brake fluid between the reservoir chamber and the bore, part of said passageway being defined outside of the body by sleeve means mounted on the body and covering a portion of the body located rearwardly of the flange, characterised in that a through-duct formed on said sleeve means defines the remaining part of said passageway and connects the forward end of said passageway part defined by said sleeve means directly to the reservoir chamber, said duct traversing said flange, wherein said sleeve means comprises a sleeve and a member interposed between said sleeve and said body, said member including a tubular extension defining said through-duct.

21. A master cylinder according to claim 20 wherein said member includes a longitudinal slot defining said part of said passageway defined by said sleeve means.

* * * * *